United States Patent [19]

Reissland

[11] 4,209,572
[45] Jun. 24, 1980

[54] VENTED PLUG FOR STORAGE BATTERIES

[75] Inventor: Martin-Ulrich Reissland, Gummersbach, Fed. Rep. of Germany

[73] Assignee: VDO Adolf Schindling AG, Frankfurt am Main, Fed. Rep. of Germany

[21] Appl. No.: 963,737

[22] Filed: Nov. 27, 1978

[30] Foreign Application Priority Data

Jan. 12, 1978 [DE] Fed. Rep. of Germany ....... 2801198

[51] Int. Cl.² .............................................. H01M 2/12
[52] U.S. Cl. .......................................... 429/53; 429/89
[58] Field of Search .............................. 429/89, 82–88, 429/53

[56] References Cited

U.S. PATENT DOCUMENTS 3,388,007  6/1968  Fiandt ..................................... 429/89

Primary Examiner—Charles F. LeFevour
Attorney, Agent, or Firm—Otto John Munz

[57] ABSTRACT

A vented plug for a storage battery, has a cap portion with a threaded stem depending therefrom for threaded engagement in the threaded fill opening of the storage battery, the interengaged threads of the stem and fill opening defining a helical space or labyrinth passage for escape of gases originating inside the battery, and providing an extensive area for condensation of liquid particles carried with the gas. Vent openings extend from the threaded area to outside the cap portion for venting the gases to atmosphere, while the condensed liquid flows back into the battery.

9 Claims, 4 Drawing Figures

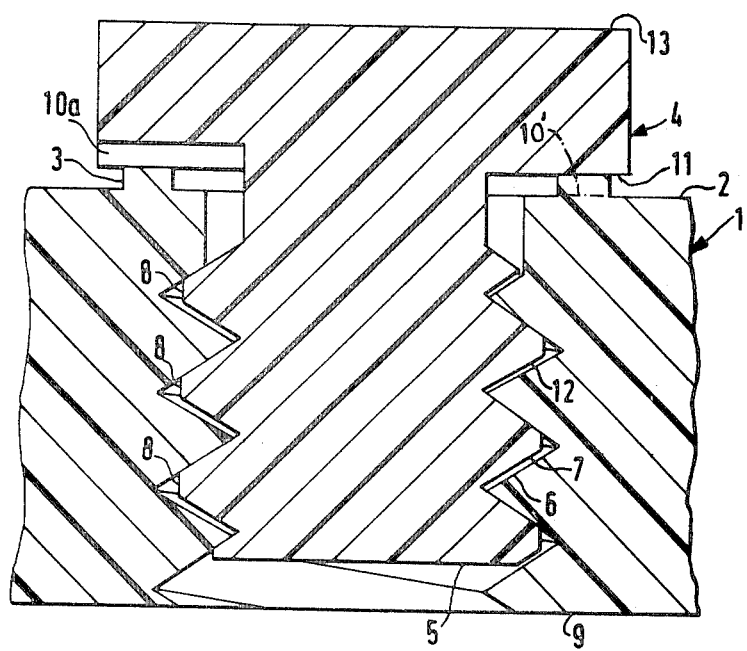
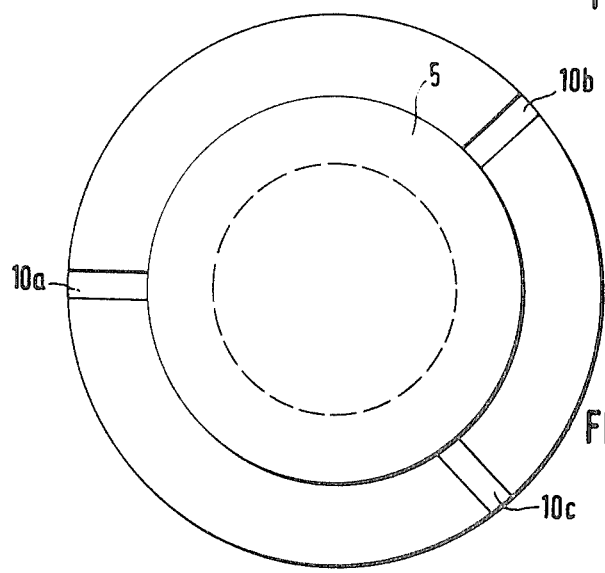

VENTED PLUG FOR STORAGE BATTERIES

BACKGROUND OF THE INVENTION

The invention relates to a plug for storage batteries, with a threaded stem which can be screwed into a threaded element of the storage batteries and with a ventilation channel which is shaped as a labyrinth over a portion of its length so as to form condensation surfaces.

PRIOR ART

Plugs for storage batteries must not close off the inside of the storage battery in a completely gas-tight manner from the external environment, so that the gases originating in the storage battery can escape to the outside. For this purpose, a passage is provided in the plugs between the inside of the storage battery and the external environment. The problem with such devices is that any liquid particles which may form, especially by condensation from the escaping gas, may escape to the outside from the storage battery and thereby produce contamination and corrosion. It is desired that the liquid precipitated in the course of the connecting path between the inside of the storage battery and the external environment be caused to flow back to the inside of the storage battery.

For this purpose, a multipart construction of the plug is known. In detail, this prior art plug comprises a cylindrical upper element which serves for handling the plug and which also forms a packing or sealing surface between the storage battery and the lower element of the plug. The cylindrical upper element is connected to a threaded coupling with which the plug is screwed into the storage battery. A bore leads through the threaded coupling to the cylindrical upper element, and is shaped like a key with tongues protruding upwardly from the inside surface. An inner element is inserted into this cylindrical upper element, and is also provided with tongues which point downward and are spaced with relation to the tongues of the upper element. The tongues of the upper element and of the lower element form a labyrinth-like section of the ventilation passage, which section begins with the bore in the threaded coupling and ends with a further bore in the inner element of the cylindrical upper element. Therefore, the labyrinth-like section is located between the two bores. Upon the escape of gas from the inside of the storage battery, liquid particles are precipitated, especially in the labyrinth-like section of the passage. The precipitated liquid collects and is discharged downward through the longitudinal bore into the storage battery. Since the upper portion of the labyrinth-like passage is free of condensed liquid, the gas can escape without carrying along liquid into the environment.

Although the prior art plug described above does provide a gas-conducting connection between the inside of the storage battery and the external environment, through which the gas can escape without carrying liquid along to the outside, the plug is relatively expensive. The high expense is primarily because the inside of the cylindrical upper element, which consists of an outer part and an inner part, has a relatively complicated shape, in order to form the labyrinth, and also the inner part must be fastened to the outer part in a separate operation.

SUMMARY OF THE INVENTION

The present invention is based on the object of producing a vented plug with condensing surfaces, while avoiding the shortcomings of the known plugs discussed above. Additionally, the present invention provides a plug which enables gas to escape while returning liquid to the battery, and the plug is inexpensive.

This object is achieved by means of a device wherein the space formed between the threaded coupling of the plug and the threaded element of the battery have thread tolerances which serve as a labyrinth-like section of the ventilation passage, and at least one passage connecting the space with the environment is provided.

In this form of the plug, choice of the manufacturing tolerances of the threaded element and the threaded coupling can ensure that an adequately large helical space is obtained between the threaded element of the plug and the threaded coupling of the storage battery. In this helical space, the condensation of the precipitatable constituents from the rising gas takes place. The precipitated liquid particles flow downward from this space, and the remaining gas, from which no further liquid can be condensed, migrates further up through the upper element of the plug and escapes therefrom, free of liquid, to the environment.

This plug can be manufactured at particularly small expense since it can be made as one piece without special shaping for the labyrinth, which is formed essentially by providing a larger tolerance of the thread dimensions of the threaded coupling with respect to those of the threaded element of the storage battery, in such a way that between the threaded element of the plug and the threaded coupling of the storage battery a free helical space is formed. In addition, a passage is provided through which the gas freed from the liquid is conducted outward. The passage itself likewise causes no large additional manufacturing expense.

This applies particularly in a preferred embodiment of the plug, wherein the passage comprises a recess on the bottom side of the plug.

In a further form of the plug, three recesses are distributed at equal distances over the periphery of the plug.

This embodiment assures that clogging of the passage between the outside of the storage battery and the inside thereof, e.g. as by soiling, does not occur.

In another modification of the plug, the passage comprises bores extending from the external surface of the plug to the threaded element.

These bores may consist of a transverse bore passing from the outer surface of the threaded element to the inside thereof, and a longitudinal bore passing from the transverse bore to the outer surface.

In a further preferred embodiment, the crests of the threads are flat, in order to increase the volume of the labyrinth-like space.

By the flattening of the crests of the threads, an enlargement of the thread is thus achieved, in addition to the space formed between the flanks of the threaded coupling of the plug and the threaded element of the storage battery.

It is also feasible to form, instead of the passage formed by the shaping of the plug, a passage between the labyrinth-like portion of the ventilation channel and the environment, by the provision of a recess in the packing or sealing ring of the storage battery to be provided with the plug.

In this case, the bottom side of the cylindrical upper portion of the plug may be shaped smoothly continuous without a recess. Nor is a bore necessary in this case for connecting the outer surface with the threaded element.

Two embodiments of the plug of the invention will be explained in the following with the aid of the drawings.

BRIEF DESCRIPTION OF THE DRAWINGS

FIG. 1 is a longitudinal sectional view of a first embodiment of a plug screwed upon a storage battery;

FIG. 2 is a bottom view of the plug of FIG. 1;

DETAILED DESCRIPTION OF THE PREFERRED EMBODIMENT

Figure 3:
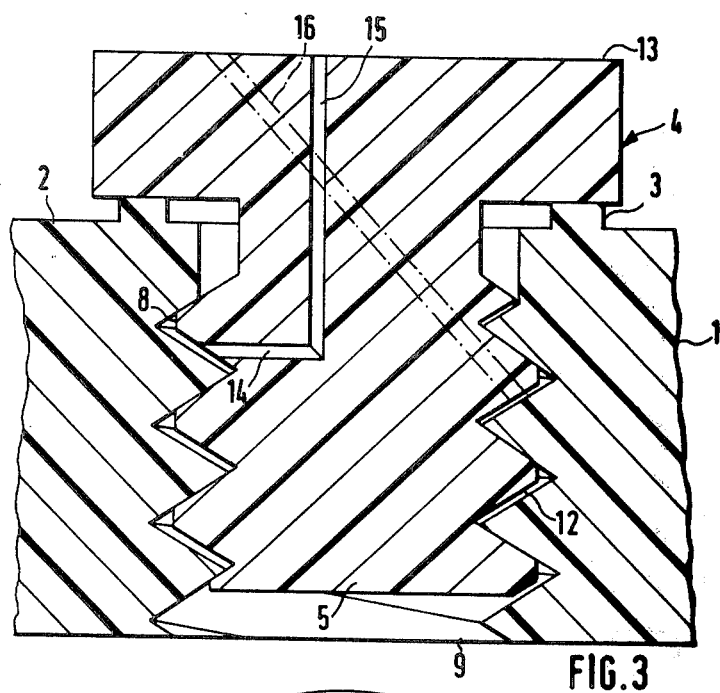
FIG. 3 is a longitudinal sectional view of a second embodiment of the plug, shown screwed into a storage battery.

In FIG. 1, numeral 1 marks a threaded element of a storage battery. The threaded element is surrounded on the top side 2 of the storage battery by an annular, raised sealing ring 3.

A plug 4, comprising a cap or head portion with a depending, threaded stem 5, is screwed into the threaded element of the storage battery, by means of its threaded stem or coupling 5. The threads of threaded element 1 of the storage battery and of threaded coupling 5 are dimensioned in such way that between the upper flank 6 of the threaded element and the lower flank 7 of the threaded coupling a helically coiled open space 12 is formed. This space is enlarged by the flattening of the crests 8 of the threads of threaded coupling 5.

The helical space formed between the threaded element 1 of the storage battery and the threaded coupling of the plug extends from the inside of the storage battery on the bottom side 9 of the threaded element to at least one recess 10 on the bottom side of the plug, whose plane bottom side 11 is engaged and sealed against ring 3. Recess 10, however, forms a passage across the ring and between the outside of the storage battery and the inside. Thus, the vent passage of plug 4 comprises recess 10 and the helical open space 12 formed between the threaded element and the threaded coupling.

As shown in FIG. 2, three equally spaced recesses 10a, 10b, 10c, may be provided on the bottom side 11 of the plug, in order to provide and assure the ventilation channel remains operative.

Figure 4:
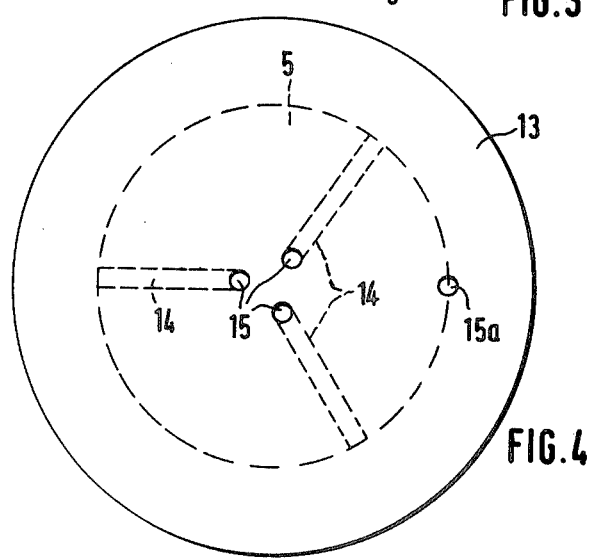
FIG. 4 is a plan view upon the plug of FIG. 3.

In the modification of FIGS. 3 and 4, an arrangement of bores, instead of recesses 10 or 10a, 10b, 10c, connects open space 12 with top side 13 of the plug.

For this purpose, a transverse bore 14 leads from the outside of the threaded coupling to the inside thereof, and connects with a longitudonal bore 15 which extends from the inner end of the transverse bore to the top side 13.

According to FIG. 4, several of such arrangements of bores may be provided, in which case each longitudinal bore 15, as shown in FIG. 3, cooperates with a transverse bore 14.

In place of, or in addition to, bores 14 and 15, one or several longitudinal bores 15a may also be provided, each of which extends in such a way that it establishes directly a connection between the top side 13 of the plug and the threaded coupling 5.

Another possibility of connection consists in the arrangement of one or more slanting bores 16. These bores present relative to bores 14,15 the advantage that they are less susceptible to soiling.

Still further, a passage 10' may be provided through the ring 3 rather than in the plug, as seen in dot and dash line in FIG. 1.

What is claimed is:

1. A vented plug for storage batteries, comprising a head with a threaded stem depending therefrom for threaded engagement with a threaded opening of a storage battery when the plug is in use, and a ventilation channel formed in the plug for establishing communication between the inside of an associated battery and the outside of the battery for venting gases generated inside the battery, the threads of said threaded stem including a portion shaped to provide a space defining said ventilation channel between the threaded stem and a threaded opening of an associated battery when the plug is in use, said space defined by said shaped threads also comprising a labyrinth passage for condensation of liquid from gas passing through the space toward the atmosphere.

2. A vented plug as claimed in claim 1, wherein the head is arranged to seat against an annular, raised ring surrounding a threaded opening on an associated battery when the plug is in use, and are least one vent passage is formed past the ring, establishing communication between the labyrinth passage and the atmosphere.

3. A vented plug as claimed in claim 2, wherein the head has an annular surface facing an associated battery when in use on a battery, and the vent passage is formed on the annular surface.

4. A vented plug as claimed in claim 3, wherein three equidistantly spaced vent passages are provided on the annular surface.

5. A vented plug as claimed in claim 2, wherein the vent passage comprises at least one bore extending through the plug from the labyrinth passage to the exterior of the plug.

6. A vented plug as claimed in claim 5, wherein the bore comprises a transverse bore extending from the external surface of the threaded stem to the interior thereof, and a longitudinal bore extending from the inner end of the transverse bore to the external surface of the head.

7. A vented plug as claimed in claim 2, wherein the plug is in combination with a battery having a threaded opening therein surrounded by a raised ring, and the vent passage is formed in the ring.

8. A vented plug as claimed in claim 1, wherein the crests of the thread on the threaded stem are flattened to enlarge the space between the threaded stem and threads of a threaded opening of a battery when the plug is in use.

9. A vented plug as claimed in claim 1, wherein the plug is of one-piece construction, and includes a radially enlarged head with the threaded stem depending from the underside thereof, said head having an annular surface on the underside surrounding the stem, said surface being arranged to seat against a raised annular seating ring on a battery when the plug is in use, and vent passage means extending through the plug from the laybrinth passage to outside the head to communicate the labyrinth passage with atmosphere.

* * * * *